(12) United States Patent
Holm et al.

(10) Patent No.: US 11,484,015 B2
(45) Date of Patent: Nov. 1, 2022

(54) SYSTEMS AND METHODS OF INTENSIVE RECIRCULATING AQUACULTURE

(71) Applicant: ATLANTIC SAPPHIRE IP, LLC, Miami, FL (US)

(72) Inventors: Thue Holm, Vejle (DK); Johan E. Andreassen, Miami, FL (US)

(73) Assignee: ATLANTIC SAPPHIRE IP, LLC, Miami, FL (US)

( * ) Notice: Subject to any disclaimer, the term of this patent is extended or adjusted under 35 U.S.C. 154(b) by 167 days.

(21) Appl. No.: 16/916,986

(22) Filed: Jun. 30, 2020

(65) Prior Publication Data

US 2020/0396970 A1 Dec. 24, 2020

Related U.S. Application Data

(63) Continuation-in-part of application No. 15/867,100, filed on Jan. 10, 2018, now Pat. No. 10,034,461,
(Continued)

(51) Int. Cl.
*A01K 63/04* (2006.01)
*C02F 9/00* (2006.01)
(Continued)

(52) U.S. Cl.
CPC .......... *A01K 63/045* (2013.01); *A01K 63/006* (2013.01); *A01K 63/04* (2013.01);
(Continued)

(58) Field of Classification Search
CPC .... A01K 63/045; A01K 63/042; A01K 63/04; A01K 63/047; A01K 63/00;
(Continued)

(56) References Cited

U.S. PATENT DOCUMENTS 2,643,481 A 6/1953 Ederer
3,200,949 A 8/1965 Aulich
(Continued)

FOREIGN PATENT DOCUMENTS

CN 102329055 1/2012
GB 2464686 4/2010
(Continued)

OTHER PUBLICATIONS

Van Der Heile Tony et al., Composition, Treatment and Use of Saline Gorundwaler for Aquaculture in the Netherlands, World Aquaculture, Jun. 2014, pp. 23-27, Nov. 2014.
(Continued)

*Primary Examiner* — Yvonne R Abbott-Lewis
(74) *Attorney, Agent, or Firm* — Malloy & Malloy, P.L.

(57) ABSTRACT

Systems and methods for intensive recirculating aquaculture are provided herein. An example system includes water sourced from a first segment of a saline aquifer, a recirculating aquaculture system receiving the sourced water and producing discharge water, and a water discharge point located within a second segment of the saline aquifer disposed below the first segment of the saline aquifer.

20 Claims, 9 Drawing Sheets

Related U.S. Application Data which is a continuation of application No. 15/157,296, filed on May 17, 2016, now Pat. No. 10,694,722.

(60) Provisional application No. 62/165,144, filed on May 21, 2015.

(51) Int. Cl.
| | |
|---|---|
| A01K 63/00 | (2017.01) |
| B01D 21/24 | (2006.01) |
| B01D 21/01 | (2006.01) |
| C02F 1/32 | (2006.01) |
| C02F 3/30 | (2006.01) |
| C02F 101/16 | (2006.01) |
| C02F 103/20 | (2006.01) |
| C02F 101/10 | (2006.01) |
| C02F 3/04 | (2006.01) |
| C02F 3/08 | (2006.01) |
| C02F 1/00 | (2006.01) |
| C02F 1/66 | (2006.01) |
| C02F 11/14 | (2019.01) |
| C02F 11/123 | (2019.01) |

(52) U.S. Cl.
CPC .......... *A01K 63/042* (2013.01); *A01K 63/047* (2013.01); *B01D 21/01* (2013.01); *B01D 21/2455* (2013.01); *C02F 1/325* (2013.01); *C02F 3/305* (2013.01); *C02F 9/00* (2013.01); *C02F 1/001* (2013.01); *C02F 1/32* (2013.01); *C02F 1/66* (2013.01); *C02F 3/04* (2013.01); *C02F 3/085* (2013.01); *C02F 11/123* (2013.01); *C02F 11/14* (2013.01); *C02F 2101/105* (2013.01); *C02F 2101/16* (2013.01); *C02F 2103/20* (2013.01); *C02F 2209/005* (2013.01); *C02F 2209/02* (2013.01); *C02F 2209/03* (2013.01); *C02F 2209/05* (2013.01); *C02F 2209/06* (2013.01); *C02F 2209/22* (2013.01); *C02F 2209/42* (2013.01); *C02F 2301/046* (2013.01); *C02F 2303/04* (2013.01); *C02F 2303/16* (2013.01)

(58) Field of Classification Search
CPC ...... A01K 63/006; A01K 61/00; A01K 61/10; B01D 21/01; C02F 2209/00; C02F 2301/046; C02F 1/001
USPC ....... 119/215, 200, 227, 226, 231, 259, 260, 119/211, 224, 230, 245, 261, 51.04; 210/605
See application file for complete search history.

(56) References Cited

U.S. PATENT DOCUMENTS

| | | | |
|---|---|---|---|
| 3,771,492 A * | 11/1973 | Doherty | A01K 63/04 119/225 |
| 3,832,720 A | 8/1974 | Cook | |
| 4,009,782 A | 3/1977 | Grimshaw | |
| 4,052,960 A | 10/1977 | Birkbeck | |
| 4,067,809 A | 1/1978 | Kato | |
| 4,394,259 A | 7/1983 | Benny et al. | |
| 4,607,595 A | 8/1986 | Busot et al. | |
| 4,728,438 A | 3/1988 | Featherstone et al. | |
| 4,915,059 A | 4/1990 | Long | |
| 4,966,096 A | 10/1990 | Adey | |
| 5,038,715 A | 8/1991 | Fahs, II | |
| 5,123,195 A | 6/1992 | Hawkins | |
| 5,317,645 A | 5/1994 | Perozek et al. | |
| 5,385,428 A | 1/1995 | Taft, III et al. | |
| 5,659,977 A | 8/1997 | Jensen et al. | |
| 5,732,654 A | 3/1998 | Perez et al. | |
| 5,961,831 A | 10/1999 | Lee et al. | |
| 5,978,315 A | 11/1999 | Moulaug | |
| 5,979,362 A | 11/1999 | McRobet | |
| 6,041,738 A | 3/2000 | Hemauer et al. | |
| 6,099,879 A | 8/2000 | Todd, Jr. | |
| 6,206,612 B1 | 3/2001 | Meyer | |
| 6,317,385 B1 | 11/2001 | Hedgepeth | |
| 6,382,134 B1 | 5/2002 | Gruenberg et al. | |
| 6,443,098 B1 | 9/2002 | Blyth et al. | |
| 6,447,681 B1 * | 9/2002 | Carlberg | C02F 3/327 210/219 |
| 6,474,264 B1 | 11/2002 | Grimberg et al. | |
| 6,499,431 B1 | 12/2002 | Lin et al. | |
| 6,722,314 B1 * | 4/2004 | Crisinel | A01K 63/042 119/245 |
| 6,902,675 B2 | 6/2005 | Kelly et al. | |
| 6,932,025 B2 | 8/2005 | Massingill et al. | |
| 6,986,323 B2 | 1/2006 | Ayers | |
| 6,988,394 B2 | 1/2006 | Shedd et al. | |
| 7,001,519 B2 * | 2/2006 | Linden | C02F 3/302 210/906 |
| 7,082,893 B2 * | 8/2006 | Schreier | C02F 3/302 119/260 |
| 7,462,284 B2 | 12/2008 | Schreier et al. | |
| 7,594,779 B2 | 9/2009 | Hildstad et al. | |
| 8,117,992 B2 * | 2/2012 | Parsons | A01K 63/00 119/226 |
| 8,141,515 B2 | 3/2012 | Nien | |
| 8,506,811 B2 | 8/2013 | Bradley et al. | |
| 8,633,011 B2 | 1/2014 | Palmer et al. | |
| 9,637,402 B2 * | 5/2017 | Tai | C02F 3/2846 |
| 9,756,838 B2 * | 9/2017 | Kunitomo | C02F 1/78 |
| 10,034,461 B2 * | 7/2018 | Holm | C02F 3/305 |
| 10,660,315 B1 | 5/2020 | Alcantar et al. | |
| 10,694,722 B1 | 6/2020 | Holm et al. | |
| 10,748,278 B2 | 8/2020 | Brubacher | |
| 10,959,411 B2 * | 3/2021 | Holm | A01K 61/95 |
| 2003/0070624 A1 | 4/2003 | Zohar | |
| 2003/0104353 A1 | 6/2003 | Brielmeier et al. | |
| 2003/0121859 A1 | 7/2003 | Kelly et al. | |
| 2004/0168648 A1 * | 9/2004 | Ayers | A01K 63/04 119/200 |
| 2004/0244715 A1 | 12/2004 | Schreier et al. | |
| 2005/0211644 A1 | 9/2005 | Goldman | |
| 2007/0221552 A1 | 9/2007 | Denney | |
| 2007/0242134 A1 | 10/2007 | Zernov | |
| 2008/0000821 A1 * | 1/2008 | Drewelow | C02F 1/20 210/150 |
| 2008/0223788 A1 * | 9/2008 | Rimdzius | C02F 9/00 202/176 |
| 2009/0145368 A1 * | 6/2009 | Brauman | A01K 61/80 119/224 |
| 2009/0145388 A1 | 6/2009 | Brauman | |
| 2010/0236137 A1 * | 9/2010 | Wu | C10L 1/19 554/8 |
| 2010/0269761 A1 * | 10/2010 | Nien | A01K 63/04 119/261 |
| 2011/0250604 A1 | 10/2011 | Cane et al. | |
| 2011/0258915 A1 | 10/2011 | Subhadra | |
| 2012/0103271 A1 | 5/2012 | Kong | |
| 2012/0125940 A1 | 5/2012 | Wright et al. | |
| 2012/0184001 A1 | 7/2012 | Stephen et al. | |
| 2013/0098303 A1 | 4/2013 | Jones | |
| 2013/0319342 A1 | 12/2013 | Musser | |
| 2013/0327709 A1 * | 12/2013 | Stroot | C02F 3/2893 210/151 |
| 2014/0261213 A1 | 9/2014 | Stiles, Jr. et al. | |
| 2015/0230439 A1 | 8/2015 | Harwood | |
| 2015/0256747 A1 | 9/2015 | Grotto et al. | |
| 2015/0342161 A1 | 12/2015 | Sheriff | |
| 2015/0366173 A1 | 12/2015 | Myers | |
| 2016/0356756 A1 | 12/2016 | Covi | |
| 2017/0260546 A1 | 9/2017 | Qimron et al. | |
| 2018/0125041 A1 * | 5/2018 | Holm | A01K 63/045 |
| 2019/0008126 A1 | 1/2019 | Shishehchian | |
| 2019/0071336 A1 | 3/2019 | Greenwald et al. | |
| 2019/0082661 A1 | 3/2019 | Lahav et al. | |
| 2019/0135393 A1 | 5/2019 | Pieterkosky | |

(56) References Cited

U.S. PATENT DOCUMENTS

| | | |
|---|---|---|
| 2019/0141964 A1 | 5/2019 | Perslow et al. |
| 2019/0169046 A1 | 6/2019 | Holm |
| 2019/0200584 A1 | 7/2019 | Holm |
| 2021/0127646 A1 | 5/2021 | Holm |
| 2021/0137082 A1 | 5/2021 | Holm |
| 2021/0195874 A1 | 7/2021 | Holm et al. |
| 2021/0227807 A1 | 7/2021 | Holm et al. |
| 2021/0235010 A1 | 7/2021 | Wallace et al. |
| 2021/0274758 A1 | 9/2021 | Holm et al. |
| 2021/0275604 A1 | 9/2021 | Holm |
| 2021/0278378 A1 | 9/2021 | Holm |

FOREIGN PATENT DOCUMENTS

| | | |
|---|---|---|
| JP | H01112935 | 5/1989 |
| WO | WO200241703 | 5/2002 |
| WO | WO2006042371 | 4/2006 |
| WO | WO2008094132 | 8/2008 |
| WO | WO2016154602 | 9/2016 |
| WO | WO2017002081 | 1/2017 |
| WO | WO017153986 | 9/2017 |
| WO | WO2018184029 | 4/2018 |
| WO | WO2018169412 | 9/2018 |
| WO | WO2021162847 | 8/2021 |
| WO | WO2021178080 | 9/2021 |
| WO | WO2021178431 | 9/2021 |
| WO | WO2021216225 | 10/2021 |
| WO | WO2021221745 | 11/2021 |

OTHER PUBLICATIONS

Garcia-Bencochea, Jose I. et al., Deep Well Disposal of Waste Waters in Saline Aquifers of South Florida, Abstract, American Geophysical Union Water Resources Research, Oct. 1970, 1 page, Oct. 1970.

Howard, Mark R., Down the Drain, Florida Trend, Jan. 1, 2000, hhtp://www.floridatrend.com/print/article/13274, 2 Pages, Jan. 1, 2000.

Gorman J. et al., Economic Feasibility of Utilizing West Alabama Saline Ground Water to Produce Florida Pompano and Hybrid Striped Bass in a Recirculating Aquaculture System, Alabama Agricultural Experiment Station, Auburn University, 19 Pages, Dec. 1, 2009.

Sharrer, Mark J. et al. Evaluation of Geotextile Filtration Applying Coagulant and Flocculant Amendments for Aquaculture, biosolids dewatering and phosphorus removal, Aquacultural Engineering, vol. 40, Issue 1, Jan. 2009, 10 Pages, <URL:https://www.sciencedirect.com/science/article/pii/S0144860908000678> (Accessed Dec. 4, 2017), Jan. 1, 2009.

Haberfeld, Joseph, Letter RE First Request for Additional Information (RAI), Florida Department of Environmental Protection, 6 pages, Jun. 4, 2013.

Storro, Gaute, Investigations of Salt groundwater at Akvaforsk Research Institute, Sunndalsora, Norway, Geological Survey of Norway, NGU-rapport 93.029, 1993, 11 pages, Jan. 1, 1993.

Milchman, Jon, Construction Clearance Permit Application, Florida Departmewnt of Environmental Protection (FDEP), 5 pages, May 12, 2013.

Sun Min et al., Models for estimating feed intake in aquaculture, a review, abstract, Computers and Electomics in Agriculture, vol. 127, <URL:http://www.sciencedirect.com/science/article/pii/S0168169916304240> (Accessed Dec. 4, 2017), 4 pages, Sep. 2016.

Notice of Draft Remit, South Dade News Leader, Hoestead , Miade-Dade County, Florida, Sep. 13, 2013, 1 Page, Sep. 13, 2013.

South Dade News Leader, Notice of Intent, Homestead , Miade-Dade County, Florida, Oct. 18, 2013, 1 page, Oct. 18, 2013.

Notice of Permit, Florida Department of Environmental Protection, 18 pages, Nov. 4, 2013.

Small, Brian et al., On the Feasibility of Establishing a Saline Aquaculture Industry in Illinois, Illinois Sustainable Technology Center [online] <URL:http://www.istc.illinois.edu/info/library_docs/TR/TR051.pdf>, 46 Pages, Mar. 2014.

AKVA Group, Recirculation Systems, 6 pages, <URL:http://www.akvagroup.com/products/land-based-aquaculture/recirculation systems> (Accessed Dec. 4, 2017).

State of Florida, Well Completion Report, Feb. 2015, 23 Pages, Feb. 2015.

Water Source, University of Alaska, Fairbanks, School of Fisheries & Ocean Sciences, 53 Pages, <URL:hhttps://www.sfos.uaf.edu/fitc/teaching/courses/fish336/materials/FISH%20336%20Letc%2031%20Water%20Quality%203.pdf> (Accessed, Dec. 4, 2017.

Lindholm-Lehto et al., Depuration of Geosmin and 2 mehtylisoborneol-induced off-flavors in recirculation aquacultre system (RAS) farmed European whitefish coregonus lavaretus, Jul. 10, 2019.

Sompong et al., Microbial Degradation of musty odor in aquaculture pond, International Journal of Agricultural Technology, Dec. 1, 2018.

Tucker et al., Managing Off-Flavor Problems in Pond-Raised Catfish, SRAC Publication, Oct. 5, 2018.

* cited by examiner

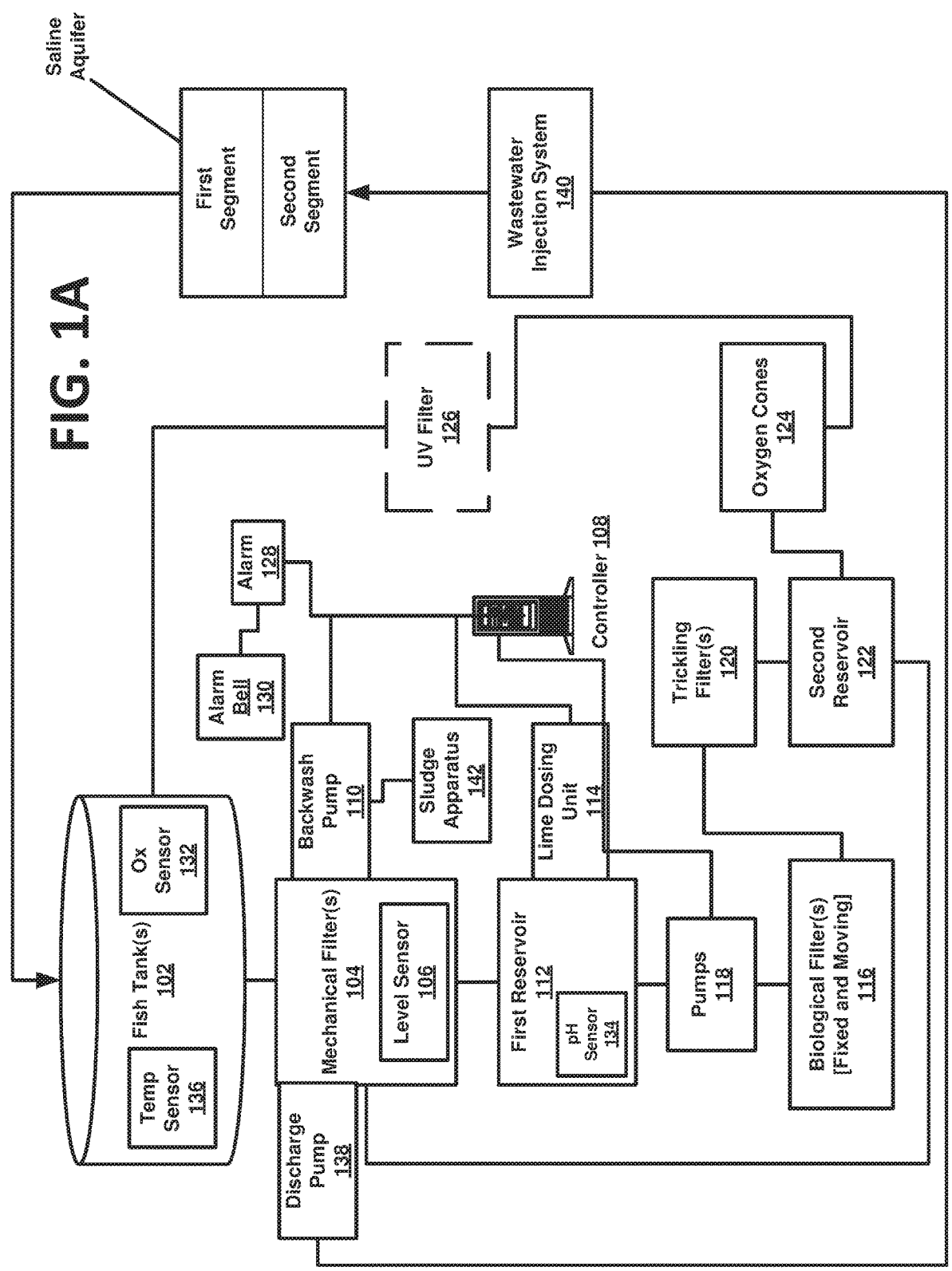

SYSTEMS AND METHODS OF INTENSIVE RECIRCULATING AQUACULTURE

CLAIM OF PRIORITY

The present application is a continuation-in-part of a previously filed application having Ser. No. 15/867,100 and a filing date of Jan. 10, 2018, which matured into U.S. Pat. No. 10,034,461 on Jul. 31 2018, and which is a continuation application of now pending application having Ser. No. 15/157,296 and a filing date of May 17, 2016, which will mature into U.S. Pat. No. 10,694,722 on Jun. 30, 2020, and which is based on, and makes a claim of priority under 35 U.S.C. Section 119(e), to a provisional patent application having Ser. No. 62/165,144, filed on May 21, 2015, all of which are explicitly incorporated herein by reference, in their entireties.

BACKGROUND OF THE INVENTION

Field of the Invention

The present disclosure is generally directed to aquaculture systems and methods, and more particularly, but not by limitation to intensive recirculating aquaculture systems and methods using water sourced from specific locations within a saline aquifer.

Description of the Related Art

Currently, there is a recognized alarming decline in conventional fisheries, which in turn is based on overfishing and harmful environmental happenings. At present, the demand for seafood exceeds the supply of available from such conventional fisheries and it is predicted that with an increased world population the demand for seafood will double in the immediate future. Accordingly, with the inability of conventional fisheries to meet such and increasing demand for seafood, has resulted in an equally increasing need for aquaculture systems or "fish farms" capable of significantly high volume of seafood production. In at least some instances, systems of this type are physically located in a geographical location having direct access to sea water. In turn, this may have a derogatory a fact on the environment in the form of pollution of coastal areas associated due at least in part to the expulsion of biological waste from the fish being cultivated as well as uneaten food into the sea or ocean.

Other factors affecting the increase in agricultural systems of the type set forth herein is the fact that certain fish species, such as salmon live most of their adult life and sea water. However for purposes of spawning, the fish return to their natural or original habitat comprising fresh water. This factor, among others has resulted in a decrease in the volume of natural salmon which are available because of alterations and/or pollution of the freshwater natural or original habitat. More specifically, the alteration of numerous freshwater environments result in problems with the migration, spotting, multiplication and survival of the naturally grown species. The decline in the natural salmon population as well as the popularity of this species as consumable seafood as further facilitated the growth of large marine farming operations and/or breeding programs in an effort to provide high-quality fish which are recognized as having an enhanced flavor and taste.

Accordingly, it is proposed that pollution and other derogatory factors relating to the existence of fish farms in coastal areas with direct access to see our ocean water may best be overcome by transferring such facilities to an inland location, where a direct access to sea water is not required. However, in order to accomplish such inland locations a proposed aquaculture system should still have direct access to an adequate water source which may be naturally fit for the raising of fish within a preferred, inland system. Further, in order to control derogatory factors associated with aquaculture systems of the type set forth herein, operations must be included which overcome disadvantages such as disease while eliminating or significantly reducing the effect of pollution on the surrounding environment.

Therefore, a proposed and preferred aquaculture system should make be capable of fish cultivation under fully controlled conditions anywhere in the world, rather than be limited to coastal areas. The technology Incorporated in such a preferred and proposed agricultural system may also be based on an inventive recirculation system of water in a fish farming facility installed inland. As such, a quality source of water should be is used repeatedly over and over again in an at least partially closed system, thus minimizing and controlling the amount of new source water added to the system.

The benefits of a controlled fish farming system incorporating a recirculation procedure are many. Further by way of example, such a preferred agricultural, fish farming system will have the ability to regulate and control an internal environment to match a cultured species of fish, an ability to reduce invasive fish diseases from the cultivating system as well as the control of temperature, salinity, oxygen and pH to meet requirements of the cultured species. Such factors may also be controlled on a predetermined and/or program basis to meet the cultivation requirements at different growth stages, such as inducing spawning, weaning fish larvae, or growing fish to market or restocking sizes.

SUMMARY OF THE INVENTION

As set forth in greater detail herein, the present invention is directed to a system for culturing aquatic life including, but not limited to Atlantic salmon. As described, the system comprises at least one tank in which water and fish are concurrently disposed as well as a recirculating aquaculture system and a wastewater injection system. Further, the one or more embodiments of the system of the present invention comprises and is operative to include water sourced from a first portion of a saline aquifer supplied to the at least one tank via a first path of fluid flow. In addition, wastewater derived in part from the recirculating system and other parts of the system parts, being discharged into a second segment of these saline aquifer, via a second path of fluid flow. As also explained hereinafter, the first and second segments of the saline aquifer are disposed in segregated relation to one another by being respectively located at water levels of the saline aquifer, where in the second segment of the saline aquifer is located a predetermined distance below the first segment of the saline aquifer and further where in both the first and second segments of the saline aquifer are located a predetermined distance below ground level.

An example recirculating aquaculture system can further comprise: (a) the at least one tank for containing water and a fish, the fish producing biological waste; (b) a filter assembly comprising at least a mechanical filter that receives the water and biological waste through gravity feeding from the at least one tank; wherein the mechanical filter removes solid portions of the biological waste; (c) a first reservoir comprising: (i) a fixed bed biological filter, defining a portion of the filter assembly and that receives the mechanically filtered water and introduces lime into the water to regulate a pH level. Through centrifugation, organic matter of the biological waste is converted into carbon dioxide, and ammonia into nitrogen; and as an option that may or may not be selected to be present in the system, (ii) a moving bed biological filter that receives the water from the fixed bed biological filter through gravity feeding; (d) a degasser that receives the water from the fixed bed biological filter and removes the carbon dioxide and nitrogen from the water; and (e) a second reservoir that regulates a temperature of the water, wherein a first portion of the temperature regulated water is re-introduced into the tank and a second portion of the temperature regulated water is diverted to an oxygenation system. In the example above, the degasser as mentioned in (d) may be a vacuum degasser so as to improve efficiency metrics.

According to some embodiments, the present disclosure is also directed to a method for raising fish including, but not limited to Atlantic salmon, in a recirculating aquaculture system, the method comprises: (a) circulating water from a water source in at least one tank of a recirculating aquaculture system, the recirculating aquaculture system; (b) introducing fish into the tank, the fish producing biological waste in the water; (c) removing the water and biological waste from an outlet of the tank; (d) passing the water with biological waste through a mechanical filter to remove solid portions of the biological waste, the mechanical filter in fluid communication with the outlet of the tank; (e) passing the water with biological waste through a biological filter to convert organic matter of the biological waste to create carbon dioxide, and ammonia of the biological waste to create nitrogen; (f) oxygenating the water; and (g) re-introducing the water into the tank at an inlet.

Therefore, the system of the present invention is directed to the culturing of aquatic life specifically including, but not limited to Atlantic salmon. As such, the system comprises at least one tank structured to concurrently contain water and fish. In addition, a first path of fluid flow is disposed in interconnecting, fluid communicating relation between the at least one tank and a first segment of a saline aquifer. The first path of fluid flow is disposed and structured to deliver water from the first segment of these saline aquifer to the at least one tank.

A recirculating system is disposed and structured to receive a discharge water from the tank and includes a filter assembly. The filter assembly is disposed and structured to receive the discharge water and generate processed discharge water, by virtue filtering the discharge water by the tilting assembly. The resulting processed discharge water is recirculated back into the at least one tank.

One or more embodiments of the present invention also include a wastewater injection assembly and/or system including a second path of fluid flow disposed in fluid communication between the recirculation system and a second segment of the saline aquifer. Moreover, the wastewater injection assembly is operative to direct wastewater to the second segment of the saline aquifer via the aforementioned second path of fluid flow. As described in greater detail hereinafter, the content, purity, salinity, etc. of the water supplied to the at least one tank is important. As a result, the first segment of the saline aquifer is disposed in substantially segregated relation to the second segment of the saline aquifer by being separated through different water levels. In more specific terms, the second segment of the saline aquifer is located a predetermined distance below the first segment of the saline aquifer, where in both the first and second segments of the saline aquifer are located at a predetermined distance below ground level. By way of a non-limiting example, the water level of the one or more first segments of the saline aquifer from which water is sourced, may be between 500 and 2,000 feet below ground level. In contrast, the water level of the second segment of the saline aquifer in which wastewater is injected, may be between 2000 feet and 4000 feet or deeper.

The importance, purity, salinity, etc. of the sourced water into the at least one tank may be best practice and as specifically stated herein, the first and second segments of the saline aquifer may be defined by correspondingly positioned first and second segments of the Floridan aquifer as described in greater detail hereinafter. As such, the first and second paths of fluid flow are respectively disposed in fluid communication with first and second segments of the Floridan aquifer and interconnected, corresponding and cooperatively structured components of the system of the Floridan aquifer.

Yet additional structural and operative features of the present invention include the filter assembly including backwash capabilities disposed and structured to generate a backwash liquid flow through the filter assembly for the cleaning thereof. As a result of such backwash flow sludge water is generated and included in the wastewater being delivered back into the second segment of the saline aquifer via the second path of fluid flow. In even more specific terms, the filter assembly of one or more embodiments of the present invention comprising at least a mechanical filter structure or assembly disposed and structured to remove solid portions of biological waste from the fish maintained in the at least one tank. The biological waste is removed from the discharge water removed from the tank. In addition, filter assembly includes a biological filter structure and/or assembly disposed and structured to convert organic matter of the biological waste where in the aforementioned processed discharge water is at least partially defined by filtered water issuing from and through the mechanical and biological filter structures and/or assemblies.

In cooperation there with, the recirculating system comprises a first reservoir disposed in fluid communication with the at least one tank so as to receive discharge water there from. The first reservoir is operative to regulate a pH level of water within the first reservoir. The recirculating system further comprises a second reservoir disposed in fluid communication with the first reservoir and or predetermined or corresponding portions of the filter assembly. The second reservoir is operative to at least regulate temperature of water therein. Therefore, the processed discharge water, as referred to herein is at least partially defined by the discharge water issuing from the first and second reservoir.

The interaction of the filter assembly with the first and second reservoirs and the cooperative operative features associated there with other operative components of the recirculating system serves to define the processed discharge water as at least partially defined by filtered, pH regulated and temperature controlled discharge water issuing collectively from the filter assembly and the first and second reservoirs, wherein said processed discharge water is subsequently recirculated, possibly after further processing, back into the at least one tank.

These and other objects, features and advantages of the present invention will become clearer when the drawings as well as the detailed description are taken into consideration.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

FIG. 1A is a schematic view of an example system, constructed in accordance with the present disclosure.

Like reference numerals refer to like parts throughout the several views of the drawings.

DETAILED DESCRIPTION OF THE PREFERRED EMBODIMENT

Figure 1B:
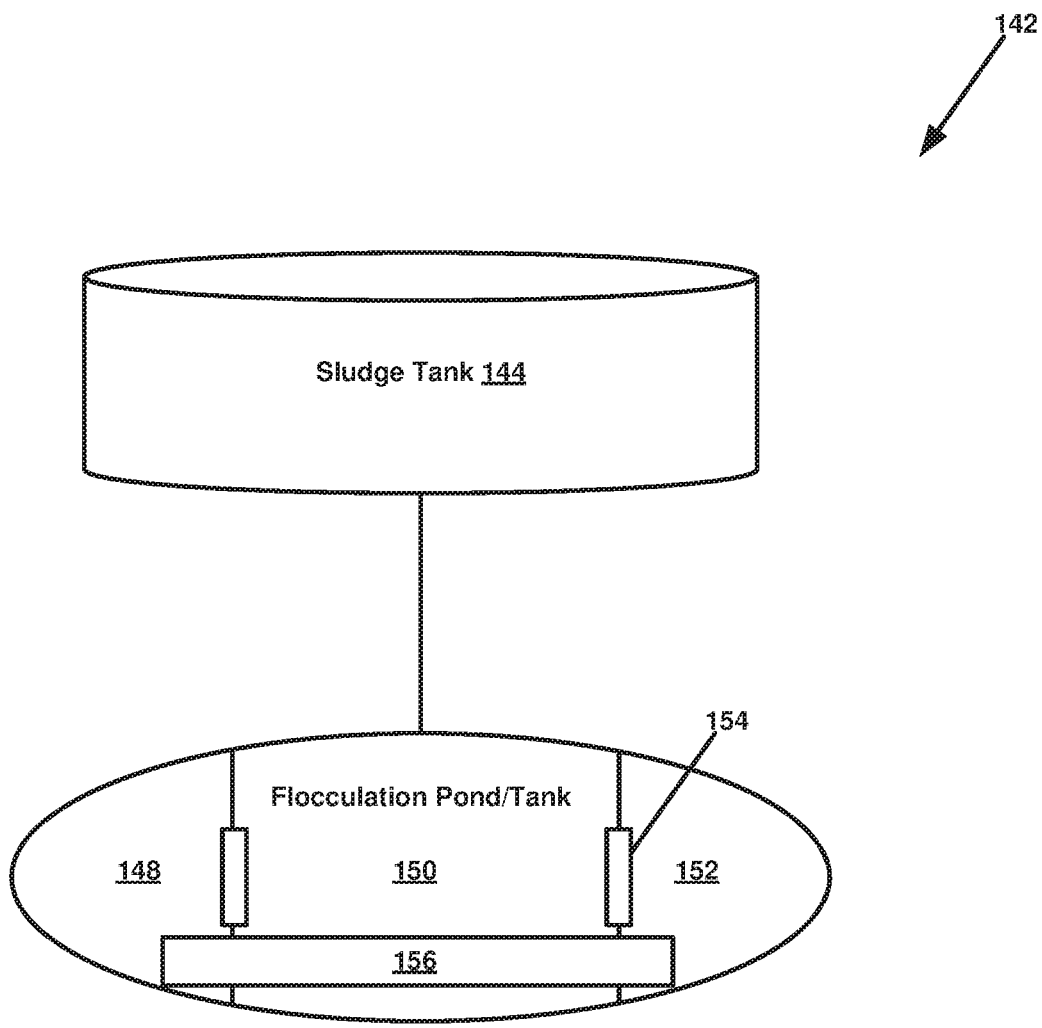
FIG. 1B is a schematic view of a sludge processing system for use with the system of FIG. 1A.

The present disclosure is directed to intensive recirculating aquaculture systems (RAS) and methods. One example of a recirculating aquaculture system comprises at least one tank that receives sourced water and at least one species of fish, such as salmon. The tank is in fluid communication with water recirculation apparatuses that process waste products introduced into the water discharge from the tank by the presence of the fish. Processing of the water can include any combination of cleaning, filtering, and oxygenating the discharge water, resulting in "processed discharge water". This processed discharge water is recirculated into the tank. These systems and methods effectively reduce an amount of new water that is placed into the recirculating aquaculture system due to losses created from cleaning the recirculation apparatuses, evaporation, and other operational reasons. In addition, wastewater may be removed from the system, tank and or filtering assembly and may include sludge and/or sludge water as set forth in greater detail hereinafter. The sludge water is created, for example, during cleaning of the filter assembly including the directing of a backwash flow there through and or other parts of the recirculation system/apparatus.

In some embodiments, the water sourced into the system is obtained from segments of underground saline aquifers. An example segment can have a salinity of five parts per thousand. Discharge and/or sludge water produced through use of the recirculating aquaculture system, as set forth above, can be injected back into lower portions of the aquifer positioned below a segment of the aquifer from which source water is obtained for the RAS. By way of non-limiting example, the water can be sourced from a Floridan aquifer. In one example, water can be taken from a lower confining unit segment (LC) and a lower Floridan producing zone one segment (LF1) of a Floridan aquifer. While the Floridan aquifer has been contemplated as an example saline aquifer the present disclosure can be applied to other saline aquifers. Moreover, the systems and methods of the present disclosure can be applied to freshwater aquifers as well, although the RAS system can include means for increasing the saline volume in the freshwater can be utilized. Additionally, if the saline content of the water obtained from a saline aquifer is above a pre-determined level, such as 40 ppt/liter (such as brackish water), the RAS can implement a means for reducing the salinity of the water.

In one embodiment, the first segment of the saline aquifer includes any segment of the aquifer that comprises water with a salinity of approximately 5 to 30 ppt/liter used in the rearing system. The second segment includes any segment or zone that is isolated from the zone from which source water is obtained.

In one embodiment, wastewater and/or sludge water created by the recirculating system are pumped back into the Floridan aquifer at a water discharge point or injection point located within a boulder zone (BZ) segment of the Floridan aquifer.

According to various embodiments of the present disclosure, 300 to 600 liters of water are consumed per every kilogram of feed delivered to the recirculating aquaculture systems described herein. At a maximum feeding schedule, only 0.2% of a total water volume is exchanged each day.

For context, recirculating aquaculture systems of the present disclosure make it possible to culture fish under fully controlled conditions anywhere in the world. The technology is based on recirculation of water in a fish farming system installed onshore, whereby the same water is used over and over again in a nearly-closed circuit, thus minimizing the amount of new water added to the system.

The benefits of a closed fish farming system are many, such as the ability to regulate and control an internal environment to match a cultured species, an ability to reduce invasive fish diseases from surroundings, and control of temperature, salinity, oxygen and pH to meet requirements of the cultured species and also to meet the requirements at the different growth stages, such as inducing spawning, weaning fish larvae, or growing fish to market or restocking sizes.

It will be understood that recycling is a process whereby water quality is controlled by a water treatment system, and not exclusively by inlet water into the water treatment system. The degree of recirculation may be expressed in various manners. In one example, the degree of reuse is expressed as a percentage, which is defined as a composition new or additional water added into the recirculating aquaculture system in relation to current water volume in the system. This value can fall within a range of approximately 95 to 99.9%, inclusive. The degree of reuse may be expressed in the following equation:

$$\text{Degree of reuse} = \frac{\text{Water flow to tanks}}{\text{Make up water} + \text{Water flow to tanks}} \times 100.$$

In another aspect, an amount of new water exchanged relates to an amount of feed that is fed to the fish per day. This is a more precise and unequivocal way of describing the degree of recirculation and is expressed in equation below:

$$\text{Water exchange per kg feed} = \frac{\text{water exchange/day}(m3LQm:1}{\text{Feeding/day}(kg/day)}.$$

In some embodiments, moderate or semi intensive recycling is based on mechanical and biological filtration of water exiting fish tanks in order to remove waste products excreted by the fish. In general, a filter assembly includes a mechanical filter structured to remove the solid particles and biological filters operative to remove the dissolved compounds such as organic matter. The biological filters are further operative to transform existing the toxic ammonia into the less toxic nitrate (nitrification) which is then diluted out of the system by newly added water.

As processed discharge water is re-introduced/recirculated back to the one or more fish tanks, aeration and oxygenation is taking place, in some embodiments. Some embodiments utilize disinfection by use of ultra-violet light (UV-filtration) prior to re-introduction of the water into the fish tanks. The exchange of water per day in such systems is normally 400-600 liter of new water per kg of feed applied to the system.

Full intensive recirculation, as described herein, can utilize denitrification filtering and phosphor removal systems. In the denitrification filter nitrate is transferred into free nitrogen. Using denitrification, it is possible to reach recycling levels less than 0.1% of new water, which equals 50 to 100 liter of new water per kg of feed applied to the system. This means that water leaving the system can potentially be reduced to the water content in sludge that comes from the mechanical and biological filters plus what leaves through evaporation. As described herein, sludge water is produced through cleaning of various mechanical and biological filters utilized in the recirculating aquaculture systems and may be defined as at least a part of wastewater delivered back to the second segment of the saline aquifer, through the aforementioned second path of fluid flow.

The water sourced for use in the system can have an impact on the processes required to convert the sourced water into water that is acceptable for fish rearing. For example, water sourced from local water supplies can comprise undesirable contaminates such as chlorine, chloramine, fluoride, and countless contaminates not filtered out by current water treatment processes such as pharmaceutical compounds, bacterium, spores, and so forth. These contaminates deleteriously affect the RAS systems and the fish raised therein.

The systems of the present disclosure can include recirculating aquaculture systems produced by Billund Aquakulturservice A/S. These systems can be utilized in accordance with the present disclosure.

The components are described in the order the water flows starting at the one or more fish tanks. The water flow has several functions in a RAS such as removal of waste products and uneaten feed pellets from fish tanks, transportation of waste products and uneaten feed pellet to a drum filter (e.g., mechanical filtration) and the biological filters, and transportation of oxygen to the fish and the biological filter.

FIG. 1A illustrates an example process showing a principal flow pattern in an example RAS, in schematic format. Generally, water is circulated in one or more fish tanks 102, which produces wastewater. From a water flow perspective tank models can be divided in two main groups: round tanks and raceway tanks. Theoretical round tanks have the best self-cleaning capability because the circular flow pattern creates an ingoing transport of particles. Square tanks with round corners almost have the same feature but in relation to round tank these tanks can save up to 20% in building area.

A fish tank includes an outlet and inlet which are designed to ensure fast removal of excrements, uneaten feed pellets, so as to create optimal conditions for the fish. It is recommended that a bottom of the tank has a slope of approximately two to five percent, which facilitates emptying of the tanks. Tank material is economical, comprises a smooth surface, resiliency and durability during use, and does not exude chemicals into the water.

From the fish tanks, discharged water runs by gravity feed into a filter assembly comprising mechanical filter(s) 104. In the mechanical filter(s), particles such as excrements and uneaten feed pellets are removed from the water. Effective removal of particles has an important influence for the fish health and the stability of the biological filter. High level of particles in the water can generate stress for the fish and thereby increase the risk of diseases, regarding the biological filters it can lead to increase in oxygen consumption and reduce the ability of nitrification in the biological filter.

Mechanical filtering of the water is accomplished, in some embodiments, by the use of drum filters. An example drum filter includes a Hydrotech™ drum filter produced by Water Management Technologies, Inc. In some cases, disc filters are used. Depending on fish species and fish size, mesh sizes of the filter cloth are in the range from 40 to 90 flm.

A level sensor 106 inside the drum filter registers when the filter cloth is starting to clog and the water level rises. The level sensor 106 transmits signals to a controller 108 of the RAS to activate the drum filter to rotate. A backwash pump 110 starts backwashing the filter cloth as well. Separated solids are rinsed off the filter cloth into the solids collection trough and then discharged, as will be described in greater detail below. Again, the process of cleaning the filter assembly through the washing of solids from the filters creates sludge waste or sludge water that can be removed from the RAS as wastewater or at least a part thereof.

It is important to check the spray nozzles on the spray bar regularly for clogging to ensure optimal cleaning of the filter cloth. If this is not done the efficiency of the drum filter falls and causes higher volumes of sludge water. The backwash pump can deliver a pressure of eight bars to rinse the filter cloth, in some embodiments. In case of maintenance or reparation it is possible to bypass the water flow around the filters.

After backwash 112 water flow has passed the drum filter it travels by gravity feed to a first reservoir 112. If required, additional water is added into the water flow in the first reservoir. Lime dosing is done in this first reservoir through a lime dosing unit 114 to regulate a pH level of the water flow. The first reservoir 112 is sized so as to provide a stabilizing effect on the water level in the RAS. The size of the first reservoir can depend on design requirements.

In some embodiment, the discharge water is pumped from the mechanical filters 104 to biological filters 116. Centrifugal pumps 118 are utilized in some embodiments. The centrifugal pumps are installed in a dry pump sump from where they lift the water to fixed bed biological filters. In one embodiment, each bio-filter has one pump delivering water to it. In case of water entering the dry pump sump a submersible pump is installed to avoid flooding of the centrifugal pumps.

The water is pumped through a fixed bed biological filter which includes three to five champers depending on the size of the flow. The champers is designed as submerged filters which mean that the bio media is covered with water at all time. In the biological filters, organic matter in the water flow is converted to carbon dioxide ($CO_2$) and the ammonia is converted to nitrate. An amount of bacteria in the biological filter is associated with the rinsing capacity of the filter. Therefore, the bio media may comprise a large surface/volume ratio which produces optimal contact surface between the water and the bacterial bio film. The bio media used can be sourced from RK Bioelement™ media, manufactured by RK·Nast A/S, which in dry conditions has a specific surface/volume ratio of approximately 600 m²/m³.

Fixed bed filters are also configured to trap fine particles in the bio film and produces very clear water (e.g., with small amount of particles in the water).

An amount of water that is pumped through the fixed bed filter depends on the size of the RAS and the water flow in volumetric measurement. In smaller systems the total water flow is pumped through the filter but in larger systems movement of the water flow volume is facilitated by pumping to a trickling filter(s) 120. In some embodiments, the water flow communicates through gravity feed from the fixed bed filter to a moving bed biological filter, should a moving bed filter be added to the system.

The water flow runs through the moving bed filter by gravity, the filter comprises one to two chambers again depending on size of system and water flow volume/characteristics. The moving bed filter has the same function as the fixed bed filter, inasmuch as it converts organic matter to carbon dioxide and ammonia to nitrate.

In the optional moving bed filter aeration keeps the bio media in constant motion. The bio-media used is the same as in the fixed bed, in some embodiments. Aeration is accomplished with a blower, and valves make it possible to control and regulate aeration of the water within the fixed bed filter.

The bio film used in the fixed bed filter is self-cleaning due to aeration and therefore cleaning of the filter is unnecessary. A volume of water flow entering the moving bed filter is the same as the volume water flow entering the fixed bed. The water flow leaves the moving bed filter by gravity and runs to the trickling filter. As mentioned above, in some embodiments, a moving bed filter may be forgone from the present invention.

From the moving bed filter the water flow is led to the top of the trickling filter(s) 120, also referred to here as a degassifier. In the trickling filter, undesired gasses in the water such as carbon dioxide (CO2) and nitrogen (N2) are degassed and at the same time the water flow is oxygenated to approximately 100% saturation. In addition, organic matter in the water flow is converted to carbon dioxide (CO2) and the ammonia converted to nitrate.

An example media used is the BIO-BLOK® (manufactured by BioBlok Solutions AS) with a specific surface of 200 m2/m3. Tickling filter ventilators are installed to ensure the correct air/water flow ratio in some embodiments.

The water flow is distributed on top of the trickling filter, over the BIO-BLOK® either by a perforated plate or distribution pipes. The plates/pipes ensure that the water is distributed evenly over the trickling filter. A good distribution across the trickling filters insures an optimal oxygenation and degassing of N2 and CO2.

Depending on a size of the RAS system and its flow, all of or only a part of the water flow entering the trickling filters comes from the moving bed filter. If only a part of water flow comes from the filter the rest is pumped directly from the first reservoir as mentioned earlier.

From the trickling filter the water runs by gravity feed to a second reservoir 122 located under the trickling filter.

An example RAS of the present disclosure comprises a second reservoir which provides temperature regulation of the water flow, and also provides a stabilizing effect on the water flow.

In relation to the daily operation of the system it is important that the system is flexible and all components are easily accessible for ease of maintenance. As mentioned above, the RAS includes bypass mechanisms that would be known to one of ordinary skill in the art so as to allow for continued circulation of water flow during maintenance of the first and/or second reservoirs.

In some embodiments, a part of the processed discharge water flow from the second reservoir 122 is communicated back to the fish tanks 102 by gravity feed and/or pump. Another portion of the water flow is pumped through oxygen cones 124 before entering the fish tanks 102. The amount of oxygen added to the processed discharge water is based upon the oxygen demand of the fish in the tanks 102. To be sure, oxygenation is not required for all embodiments, but is based on the biological characteristics of the fish. Stated otherwise, need for additional oxygen in the fish tank 102 depends on any of the biomass, the size of the fish, feeding rate, the water temperature, salinity and the pressure of the water where the oxygen is added. However, in at least one embodiment oxygenation of the fish tanks 102 specifically including, but not limited to, the on-growing tanks and/or blowout section may be accomplished by oxygen injection by means of a Venturi injection system rather than the utilization of oxygen cones.

As mentioned above, the processed discharge water which has passed the trickling filter has 100% oxygen saturation. In some instances, in order to fulfil the demand for oxygen in the fish tanks 102, pure oxygen is added to the water flow by use of oxygen cones.

Some embodiments of an RAS include disinfecting and/or sterilizing apparatuses. For example, a UV filter exposes the water flow to UV radiation, and thereby disinfects the water flow before introduction and/or re-introduction into the fish tanks. The UV filter 126 can be positioned two different places in the RAS; after the oxygen cones or between the fixed bed biological filter and moving bed biological filter. Different UV filter models are used depending location. If the UV apparatus is placed after the oxygen cones an in-line UV apparatus is used. If the UV apparatus is placed between the fixed and moving biological filters a channel UV is used.

In some embodiments, approximately 30-40% of the total water flow in the system is treated with a UV dose equal to approximately 30 mWs/cm 2. The processed discharge water passes the UV filter 126 either by gravity or pressure (pumped).

In some embodiments, the RAS comprises a central PLC or controller 108, but all equipment can be run in manual operation if necessary. Selected parameters are monitored by the controller and regulated in order to ensure a stable and efficient system. Regulated and alarm-based parameters include, but are not limited to, oxygen, pH level, temperature, carbon dioxide, salinity, water levels, pump stops, water pressure, thermal failure, hour meter on pumps, running status (manual or automatic or turned off), alarm history, and any combinations and permutations thereof are recorded.

In some embodiments, parameters can be constantly monitored such as low oxygen, high oxygen, pump stops, pumps status of the troughs, pump status of the trickling filter, low water level, high water level, low temperature, high temperature, low pH, high pH, thermal failure, sludge water levels, valve status(es), electrical parameters, and pressure parameters as well as any combinations thereof.

Parameters that are visible in the monitoring system oxygen, pH, temperature, hour meter on pumps and running status man./auto or turned off, on/off time on the pump that pumps water out of the RAS, and alarm history.

Each of these parameters described above will be associated with optimal operating ranges.

If any of the parameters is out of its given operating range, an alarm 128 can be activated that activates on an alarm bell 130. The controller 108 can also transmit an SMS message to RAS operating personal in charge of the facility.

Each fish tank 102 can comprise an oxygen sensor 132 that controls the addition of oxygen. These sensors provide signals to the controller 108, which in turn activates solenoid valves of an oxygen system, adding oxygen through oxygen flow meters. In some embodiments, the oxygen level in the fish tanks 102 is constantly monitored and in case of lethal levels (high or low) an alarm will be activated and the emergency oxygen diffusers will turn on. The emergency diffusers are placed on the bottom of the fish tanks. The emergency oxygen system automatically turns on if the following situations appear such as power failure, pump failure, and/or low oxygen concentration in tanks. It is important to test and regulate the emergency system frequently to insure it works optimally.

The RAS also comprises a pH control system. In one embodiment, the pH control system is controlled using several non-limiting parameters such as CO2 production from the fish and any heterotroph bacteria in the filters, hydrogen production from the nitrification in the biofilters, and hydroxide production for a possible denitrification in the biofilters. For the pH regulation a base is added to increase the water pH and/or increase a buffer capacity of the water.

In some embodiments a lime solution (such as Ca(OH)2 [Calcium Hydroxide] is added to the water flow. The Ca(OH)2 is added by the lime dosing unit 114, which is controlled by signals generated by a pH sensor 134.

Temperature regulation within the RAS can be accomplished based on various factors such as temperature of the surroundings (summer/winter), amount of replacement water added to the system, temperature of the replacement water, degree of insulation of the whole system, and total energy use in the system, as well as any combinations thereof. A temperature in the RAS is monitored by a temperature sensor placed in the first reservoir. The temperature sensor is connected to the controller and depending on a set point temperature and the actual temperature in the system, the controller can open a motor valve and a circulation pump brings cold or warm water to a cooling spiral established in the second reservoir to regulate stabilize the water temperature (e.g., bring within a safe operating temperature range).

Figure 3:
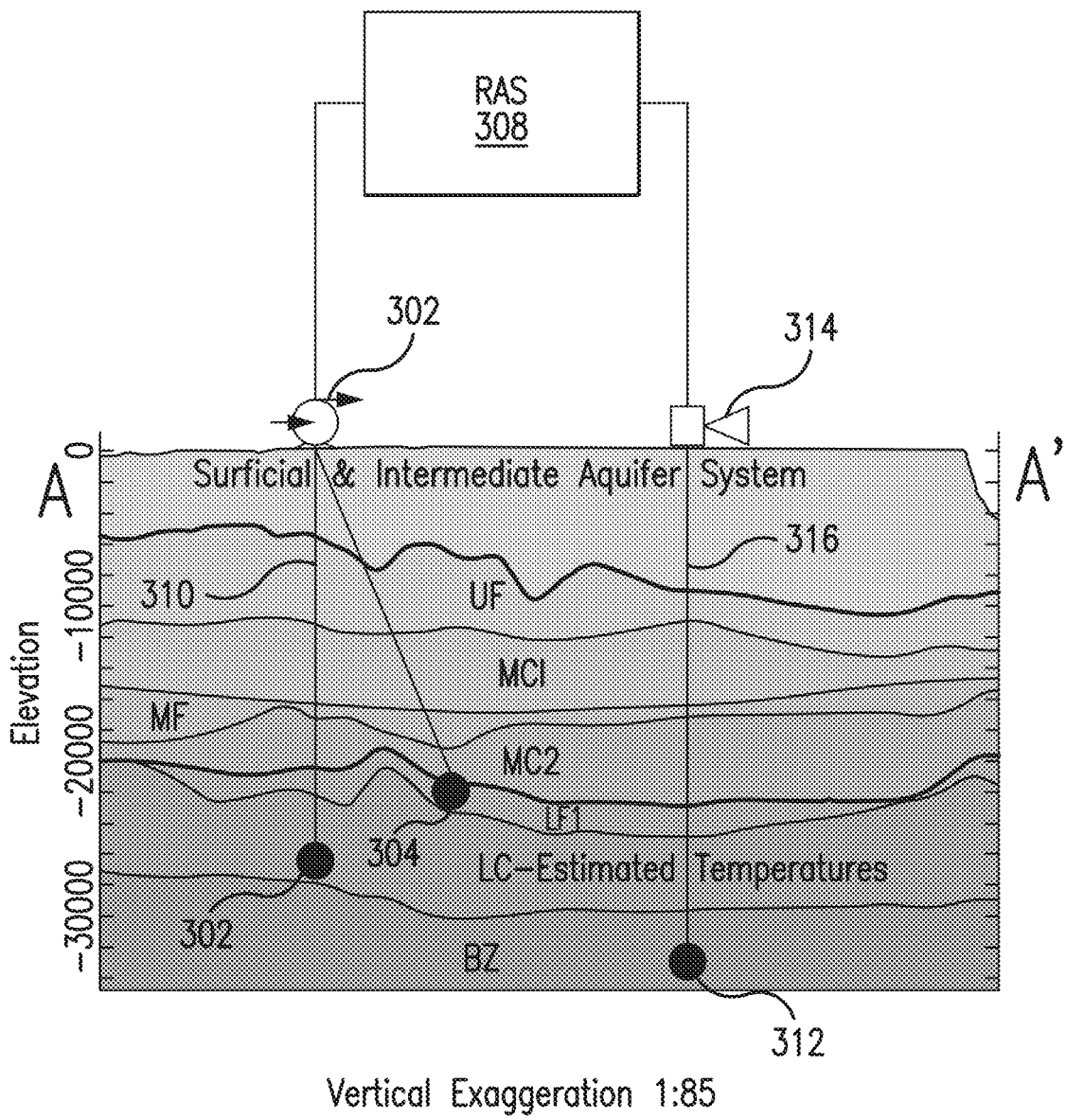
FIG. 3 is a cross sectional view of a stratification of the Floridan aquifer.

As mentioned above, sourced water is supplied from a first segment of the saline aquifer into the fish tank 102 by means of a first path of fluid flow generally indicated as 150. As such, the first path of fluid flow 150 as described in greater detail with reference to FIG. 3 is disposed in fluid communication between the one or more fish tanks 102 and the first segment of the saline aquifer. As also indicated, wastewater which may include sludge water is communicated away from the system of the present invention and injected back into the second saline aquifer by a second path of fluid flow generally indicated as 152 accordingly, the second path of fluid flow is disposed in fluid communication between the second segment of the saline aquifer and at least the recirculating system and/or filter assembly as schematically represented in at least FIG. 1A. The aforementioned sludge water results from cleaning operations of RAS components, wherein the sludge water may be considered a part of wastewater directed out of the system to the second element of the saline aquifer via the second path of fluid flow generally indicated as 152. Wastewater from the system associated with the re-circulated fish farm of the present invention comes from three RAS components: (1) discharge water from the fish tanks; (2) sludge water created from cleaning of the mechanical filters; and (3) sludge water originating from cleaning of the biological filters.

To compensate for the discharge/removal of sludge water, replacement water is added in the first reservoir 112. The exchange of process water out of the RAS is controlled by a discharge water pump 138. This discharge water pump is controlled by the controller 108 so it is possible to determine a specific volume of discharged water by programming the controller with specific discharge parameters.

The discharge pump 138 can be coupled with a wastewater injection system 140 that injects wastewater possibly including sludge water back into the second segment of the saline aquifer via the second path of fluid flow 152.

In addition to the exchange of process water, the adding of replacement water is also controlled by a level sensor measuring a water level inside the first reservoir 112. When the water level decreased below the specified level, the controller causes a motor valve to open and at the same time an inductive flow sensor measures the amount of replacement water which is added to the RAS.

Referring now to FIG. 1B, with respect to sludge water, the production of sludge from one kilogram of feed depends on different factors such as fish species and fish size, and feed conversion rate (FCR). Quality of fish feed also affects sludge production such as physical quality (dust), composition (oil, nitrogen, phosphor, carbohydrate), raw materials (animal, blood meal, vegetables, and so forth), digestibility (dissolved and un-dissolved waste, amount of excrements), excrements (consistency), and production methods (extruded pellets, pelleted pellets)—just to name a few.

Feed management can also affect sludge production such as feeding strategy, feeding levels, feed waste, sludge age, whether the sludge has been thickened, how long the sludge has been stored and so forth.

Sludge production from a RAS originates from cleaning of mechanical filters. For example, the amount of sludge water originating from the mechanical filters is approximately 150-200 l/kg feed. The dry matter (DM) of the water is varying from 350-700 mg SS DM/L, as an average 500 mg SS DM/L equals to 100 g DM/kg feed.

The fixed bed filters can be cleaned/back flushed every four to six weeks because of sludge inside the biological filter will create bacterial growth and capture of fine particles. The amount of water originating from the back flushing of the biological filters depends on the interval of flushing. The dry matter of the sludge originating from the biological filters is approximately 0.3% DM. The production of sludge in the biological filters is in average 50 g DM/kg feed.

A total production of sludge is approximately 150 g DM/kg feed. In order to reduce the discharge of sludge from a fish farm, the sludge can be concentrated to approximately 2-3% DM by use of coagulants and removal of the water by use of a belt filter. The following coagulants can be utilized: (a) ferri-chloride (FeCb)-phosphor dependent; (b) aluminum-sulfate (AlSO4)-phosphor dependent (be aware of accumulation of aluminum in the RAS).

When working with phosphor removal it will be understood that phosphor is mainly bound to particles. Thus, phosphor removal can depend on coagulation and flocculation where fine particles (less than one f.lm) are captured in larger sludge particles.

Dosing of ferri-chloride (FeCb) can be accomplished using 1.4 mol iron per mol of diluted phosphor which require removal. In practice the following has been observed:

(a) eel farm: 10 mg $PO_4^{3-}$/l to 1.5 mg $PO_4^{3-}$/l: 75 ml/m$^3$ of water; (b) trout farm: 9 mg $PO_4^{3-}$-jl to 0.3 mg $PO_4^{3-}$/l: 120 ml/m$^3$ of water; (c) other fish species approximately 1 ml 13% FeCb per liter of sludge produced.

After addition of the chemical it is important to achieve good sweep coagulation in order to form flocks that can subsequently be easily separated from the water. The flocculation process requires an energy input in order to be able to create collisions between the growing metal hydroxides and the destabilized colloidal pollutants.

Mixing occurs adjacent to the flocculation ponds in the form of three separate tanks connected in series. Retention time for the entire flocculation phase, spread over the tanks, is 15-20 minutes.

Gate-type agitators are used which provide about 80% unrestricted area. A peripheral velocity of about 0.5 m/s is recommended in the first flocculation tank. This speed should be reduced gradually to 0.3 m/s in tank two and to about 0.1 m/s in the last tank. These tanks can be shaped as squares. An optimal relation between agitator diameter and width of the tank is 0.8, in some embodiments.

The mixing speed created by different agitators can be individually checked to ensure optimum results. Some of the many factors that can influence the required agitation rate are water quality, chemical dose rate, temperature, and retention time.

It is noteworthy that the water leaving the flocculation process is not subjected to greater forces than those encountered in the tanks. The flocculation tanks can be located directly adjacent to a separation stage and the water velocity when entering the belt filter can be established as being no higher than 0.1 m/s. The speed of the belt is selectively adjustable from 1-15 m/minute.

In one embodiment, concentrating sludge to a DM of 4-5% can be achieved by the use of coagulants and in addition adding a polymer to the sludge water before passing the sludge to a belt filter. In addition, in at least one embodiment, centrifugal filtering is used subsequent to the belt filter in order achieve an even greater degree of compression of the concentrated sludge. In practice the following has been observed by dosing polymer: (a) 1 g polymer/kg feed equal to approx. 5 g/kg DM; and (b) approximately 2 ml 0.1% solution of polymer per liter of sludge produced can be utilized.

Sludge water from the mechanical and biological filters is collected in a sludge tank 144. From the sludge tank the sludge water is pumped to a first flocculation tank 146. In one embodiment, the first flocculation tank comprises three separated chambers connected in series 148, 150, and 152. In a first flocculation tank, ferri-chloride (FeCb) and polymer is added and pH is adjusted. In order to achieve good flocculation gate agitators are connected in each chamber, such as gate agitator 154.

Retention time for the entire flocculation phase, spread over the tanks, is 15-20 minutes. When the sludge water passes the flocculation chambers, sludge particles are growing and when leaving the chambers the sludge particles are separated from the water by passing a belt filter 156. Sludge is drained on the belt and scraped off at the top of the belt. A jet washing system can be used to clean the belt by high pressure water.

The sludge pump, gate agitators, and belt filter are operated at the same time, controlled by water level inside the tank of the belt filter. In addition, the belt filter is operated by a frequency converter to adjust speed of belt.

The clean water can be spray irrigated on surrounded areas or discharged to a river, the sea, or into portions of an aquifer as described above. The sludge can be stored in a storage tank and used as a fertilizer in other embodiments.

As mentioned above, the systems and methods of the present disclosure involve using a saline aquifer to source and/or dispose of water used in an RAS. In one embodiment a Floridan aquifer is utilized. The artesian aquifer is one of the world's most productive aquifers covering the entire state of Florida. The Floridan aquifer was created millions of years ago when Florida was underwater. Today the Floridan aquifer is a major source of fresh drinking water for many communities in Southern Florida. Utilizing naturally occurring filtration systems, fresh water is drawn from the upper layers, referred to as a first segment, while wastewater is injected deep into the 'boulder zone' of the aquifer, referred to as the second segment.

The water travels through miles of natural sand-filters before rising into a stream of fresh water Like all sources of fresh water the wells have a highest level of biosecurity to avoid pollution and contamination.

The natural system of the Floridan aquifer delivers cold, purified waters through miles of sand-filers into Southern Florida from deep sea. Harvesting this cold, purified water and using the same within the RAS systems of the present disclosure allow for raising of Atlantic salmon efficiently even in a tropical zone.

Figure 2:
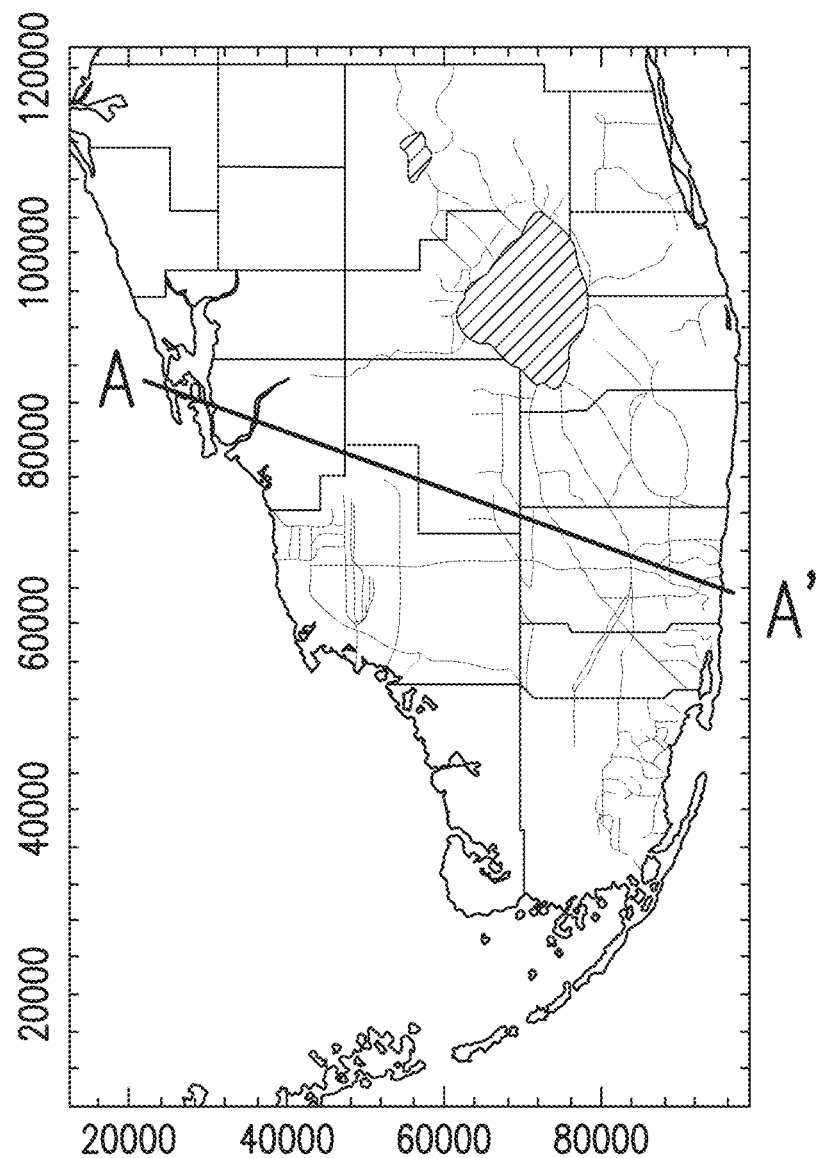
FIG. 2 illustrates a line of demarcation for a Floridan aquifer.

FIG. 2 illustrates a line of demarcation A-A' that is representative of a position of the Floridan aquifer. FIG. 3 illustrates cross section and stratification of segments of the Floridan aquifer taken along the line of demarcation A-A'. An example extraction point 302 in the (LC) first segment of the saline aquifer is illustrated as well as an example extraction point 304 in the (LF1) segment. A pump station 306 associate with an RAS 308 removes the water from either the extraction point 302 or the extraction point 304. The pump station 306 draws water through a drill string 310. For purposes of clarity, the different extraction points 302 and 304 individually or collectively may define the aforementioned first segment of the saline aquifer, wherein source water can be extracted from either or both of such extraction points 302 and 304 via a first path of fluid flow 150 into the one or more fish tanks 102. With further reference to FIGS. 1a and 2, the first path of fluid flow 150 comprises a pump facility, such as pump station 306 and the drill line or pump line 310 disposed in fluid communication with a corresponding injection point 302, 304 of the corresponding first segment (LC), (LF1) of the saline aquifer.

An injection point 312 is located within the (BZ) second segment of the saline aquifer. Wastewater water possibly including sludge water is injected into (BZ) second segment of the saline aquifer through the injection point 312, via the second path of fluid flow 152, operatively associated with the wastewater injection system 140, 314, including pump facility 314 and a pump string 316. Accordingly, the second path of fluid flow 152 is disposed in fluid communication with at least the recirculating system of the present invention, schematically represented in FIG. 1a and the second segment of the saline aquifer, at injection point 312. As such, the second path of fluid flow comprises a pump facility 314 and a pump line 316.

According to various exemplary embodiments, water may be sourced from the first segment of the saline aquifer (LC and/or LF1 water level segments) and discharged into the second segment of the saline aquifer (BZ water level segments). According to various exemplary embodiments, above the UF water level segment is acceptable for use as freshwater and drinking water. Between UF and MC2 water level segments is brackish water and water is used for desalination plants. Below MC2 water level segment there is pure saltwater.

A cold water zone is located in the South East of Florida. The South Eastern zone of Florida is heavily populated and contains many protected natural reserves.

The system and methods of the present technology allow for raising of various fish species, such as Atlantic salmon, and using various combinations of oxygenation, degassing, particulate removal, bio-filtering, sanitizing, flocculation, and denitrification. Denitrification is an optional step in some embodiments.

The following sections describe the use of the present disclosure to raise salmon with a yearly production of 30000 tons HOG of 4.5 to 5 kg gram fish.

The RAS facility includes 20 separate systems when eggs are bought from an external supplier. The system is designed to comprise two separate production lines to ensure biosecurity, possibility of producing under different standards in each system, and possibility of using different genetics. The RAS facility can comprise two hatcheries, two start-feeding and Parr systems, two smolt systems, two post smolt facilities, and 14 on growing systems.

The specifications (amount of tanks, volumes, flows etc.) for the different systems are given in the Table 1 illustrated below. The total production of the facility is approximately 6,000 to 100,000 tons of 4.5 kg to 5 kg salmon per year. The production plan and the dimensioning of the facility are based upon an input of four batches per year. A total production cycle (end-weight 4.5 to 4 kg) will in average take 90 to 95 weeks after hatching with time scheduled for grading and other production requirements.

The production is based on four batches of egg intake of late maturation fish. The fish will survive two winters so that the natural biological clock of fish will not get disordered and maturate early.

With respect to the hatchery, the fish enter as sizes of 0.18 to 0.2 grams and exit at 0.16 to 0.18 grams. The roe from the egg supplier will deliver 2,500,000 roe per batch and receive 4 batches per year, so around 10,000,000 roe per year. Roe are place in the hatchery and hatched. The hatchery includes eight comphatch units and the hatching cabinets are easy to maintain and provide easy removal of the trays for eggs shells and dead eggs. The yolk sack is absorbed and the when the fingerlings are ready they will be moved to the fry for start feeding. A mortality rate of 7% is calculated during the hatching. For further information on the system see table 2.1.

Start feeding tanks (size in 0.12 grams to 0.14 grams; size out three grams; and time in system up to 2.5 to three months). These feeding tanks comprise two 25 0 3 m tanks that are one meter deep. 0 3 m tanks are efficient to operate for start feeding. The fish are grown up to three grams in size and transferred and graded to the Parr tanks. When transferred they are graded a first time. The normal mortality will not be higher than 5% in the start feeding but by the first grade and culling of 10% of the slowest fish.

Parr tanks (size in 3 grams; size out 20 grams; time in system up to 2.5 to 3 months). Fish stay in the Parr tanks until they are 20 grams and then they are transferred to smolt tanks. In this stage mortality is very low 5%. The fish are graded in this transfer as well. Smolt tanks (size in 20 g; size out 70 g; time in system up to 3 months). In the smolt system salinity will be brackish and they will remain therein through winter. Then when the fish reach 70 grams they are transferred to the post smolt system.

Post Smolt tanks (size in 70 g; size out 200 g; time in system up to 3 to 5 months). In the post smolt system the salinity will be brackish (around 12 ppt/liter) to keep the fish in the smolt stage. The system has three sizes of tanks, in some embodiments. Then at 200 to 300 grams in size, the fish are transferred to the on-growing systems. These post smolt tanks are design to be able to produce 350 g fish to have buffer in the system production delays or increased production later.

On-growing systems (size in 200 g; size out 5250 g; time in system up to 12 months). The fish can be held in 0 25 tanks for up to 32 weeks. The final weight in the 0 25 m tanks is 1.9 kg. This process should take six months so as to leave an extra buffer in the production system. The fish will be graded upon transfer and split in three sizes and the smallest are culled. The fish will have a second winter in this system in six weeks before being transferred to the 0 31 m tanks. The fish can be held in 031 tanks up to 24 weeks. The final weight in the 0 31 m tanks is 5.25 kg.

016 m tanks (size in 5250 g; size out 5250 g; time in system 2 to 3 weeks). These tanks are operated on flow through to remove any potential off-flavour from the fish. The fish from the 0 27 m tanks are split in three groups with grading and small fish being returned to tanks with equal size of fish. One tank is maintained to remove off flavour for two weeks (one week minimal feeding). So the system includes of nine 0 18 m tanks.

The below data in Table 1 describes the dimensioning criteria used in dimensioning of the RAS facility. This describes half of the facility.

TABLE 1

| | | Systems | | | | | | | |
|---|---|---|---|---|---|---|---|---|---|
| | | Hatchery | Fry and Par | Smolt | | Post Smolt | On growing | | Harvest* |
| | | 03 m | 05 m | 08 m | 010 m | 013 m | 025 m | 031 m | 018 m |
| Temperature | °C. | 5.8 | 16 | 16 | 16 | 16 | 16 | 16 | 16 |
| Salinity | ‰ | 0 | 0 | 0 | 3-4 | 12 | 12 | 12 | 12 |
| Number of fish tanks | pc. | 4 | 25 | 14 | 9 | 9 | 9 | 8 | 16 | 9 |
| Fish tank diameter (0) | m | — | 3 | 5 | 8 | 10 | 13 | 25 | 31 | 18 |
| Water level | m | — | 1 | | 2.8 | 3.2 | 4 | 10.5 | 10.5 | 10.5 |
| Fish tank height | m | — | 1.2 | 1.8 | 3.3 | 4 | 5 | 11 | 11 | 11 |

TABLE 1-continued

| | | Hatchery | Fry and Par | Smolt | | Post Smolt | On growing | | Harvest* |
|---|---|---|---|---|---|---|---|---|---|
| | | 03 m | 05 m | 08 m | 010 m | 013 m | 025 m | 031 m | 018 m |
| Fish tank volume | m3 | — | 7.1 | 32 | 140 | 250 | 530 | 5150 | 7920 |
| Total fish tank volume | m3 | — | 178 | 448 | 1.260 | 2.250 | 4.770 | 41.200 | |
| Water flow per fish tank | m³/h | 14.4 | 21 | 80 | 280 | 500 | 800 | 7700 | |
| Total water flow to fish tanks | m³/h | 14.4 | 525 | 1.120 | 2.520 | 4.500 | 7200 | 61600 | 7800** |
| Water exchange in fish tanks | times/h | — | 3 | 2.5 | 2 | 2 | 1.5 | 1.3 | 1.3 | 1.0 |
| Retention time in fish tanks | min. | — | 20 | 24 | 30 | 30 | 40 | 45 | 45 | |
| Biomass (max.) | kg | — | 3.560 | 22.400 | 126.000 | 292.500 | 468.000 | | — | — |
| Fish weight-start | g/pc. | — | 0.18 | 3 | 20 | 70 | 160 | | | |
| Fish weight-end (max) | g/pc. | — | 3 | 20 | 70 | 160 | 350 | | | |
| Densities (average max) | kg/m³ | — | 20 | 50 | 50 | 65 | 65 | 75 | 95 | 95 |
| Feeding rate (theoretical) | kg/day | — | 6 | 2.4 | 1.5 | | | — | 48.000 | No feeding |
| Biofilter capacity | Kg/day | — | 214 | 560 | 1890 | | 4000 | — | 48.000 | — |

*For all systems
**Is on flow through

Resource requirements of the systems depends on how intensive the systems are used. At full capacity at all levels the average operational consumptions are expected to be (1) water—the water exchange in the systems can be higher if the water is also used for cooling of process water. (b) electricity—the electrical energy consumption installed is estimated to 16,000 kW. If all equipment is desired to run in case of power failure it is advisable to install an emergency generator; (c) oxygen—the amount of oxygen added to the water depends on several factors. The supply of oxygen to the system can be done by a Cryo tank or by an oxygen generator. Oxygen backup for emergency events is located onsite. At max feeding capacity, the daily oxygen consumption will be approximately 0.5 kg 02/kg feed. Oxygen 50,000 kg/day; (d) lime dosing of lime (Ca(OH)2) for regulation of pH depends on several parameters. Estimated consumption is approximately 0.1 kg lime/kg feed equals 10,000 kg of lime per day; and (e) carbon source—the denitrification process needs a source of carbon and it will need around 10,000 kg day of methanol.

Figure 4:
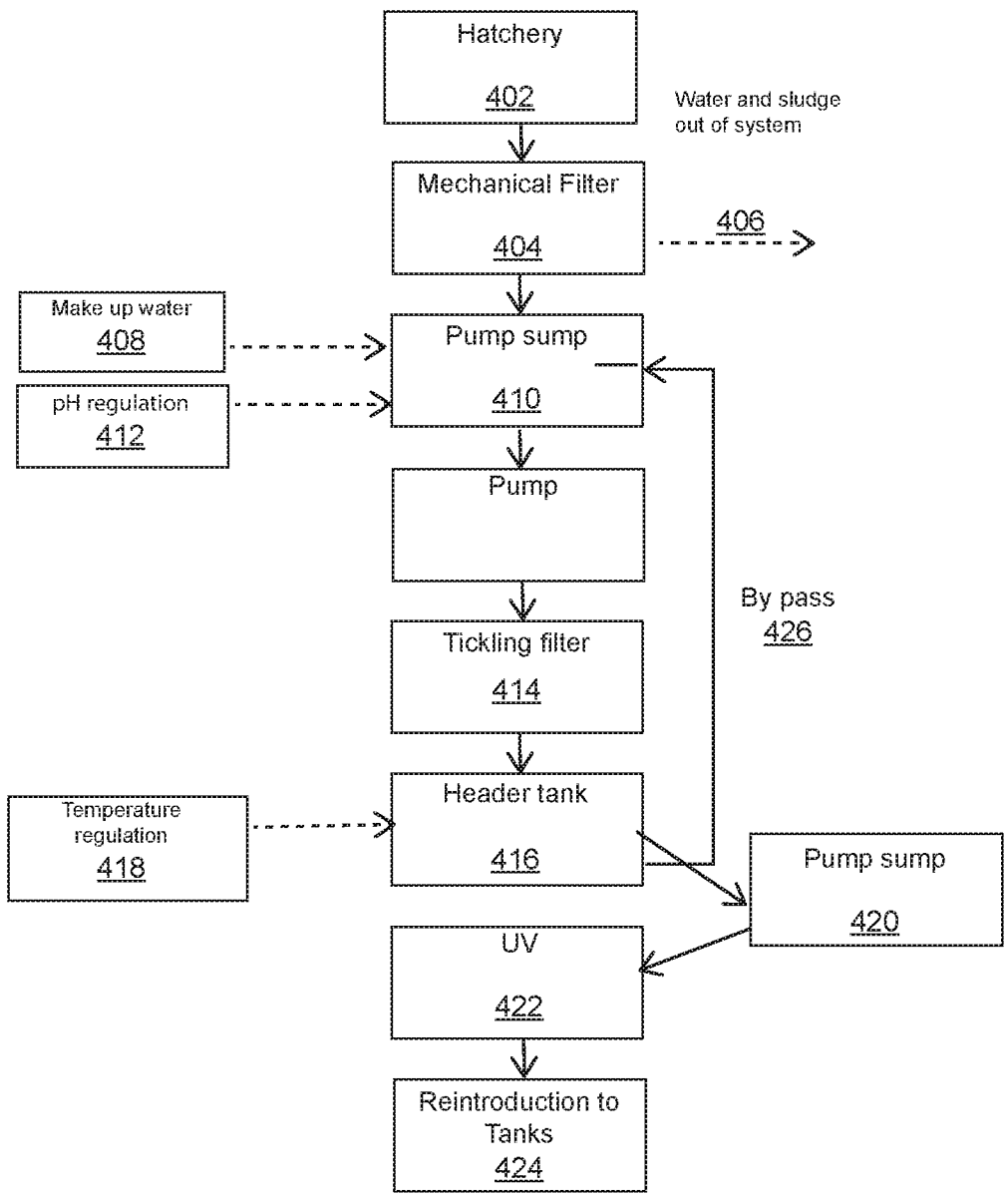
FIG. 4 is a flowchart of an example method of the present disclosure.

FIG. 4 is a flowchart of an example process for using an RAS of the present disclosure. In one embodiment the method includes a step 402 of operating hatchery tanks associated with a RAS. The water flow from fish tanks in the hatchery is directed to a mechanical filter in step 404. Sludge water produced by cleaning the mechanical filters is directed out of the RAS in step 406. As mentioned above, the sludge water can be processed using a flocculation system.

In step 408 replacement water lost through the mechanical filter cleaning process is introduced using the pump sump 410. Lime dosing can occur in step 412 and also occurs using the pump sump 410 of the first reservoir.

A pump delivers the water flow to a trickling filter in step 414 and then into a header tank in step 416. Temperature regulation of the water flow occurs in step 418, if necessary. A pump sump associated with a second reservoir is used transfer the water flow in step 420 prior to disinfecting of the water flow in step 422. Again, the step 422 of disinfecting is an optional step. The water flow is re-introduced to the operating the hatchery tanks in step 424.

The method can include an optional bypass step 426 that is used to return temperature controlled water back into the first reservoir.

Figure 5:
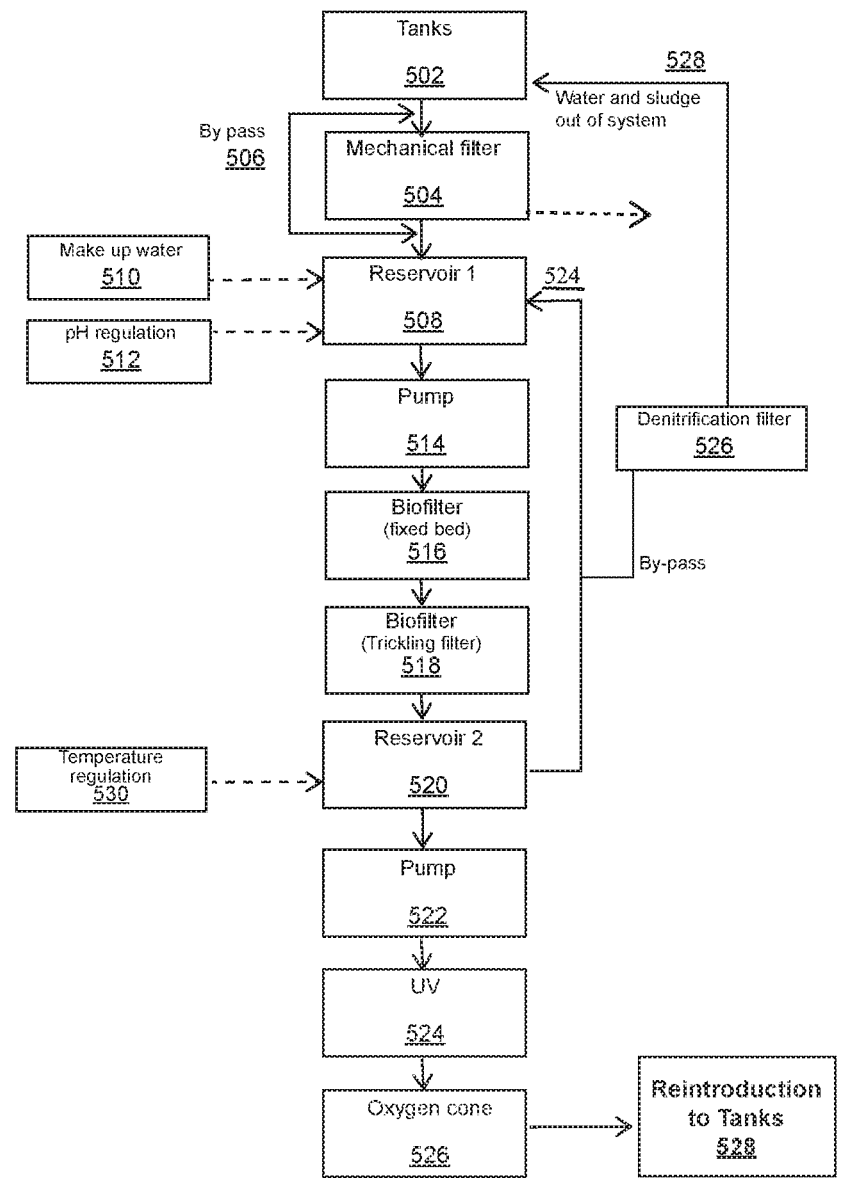
FIG. 5 is a flowchart of another example method of the present disclosure for operation of RASs of the present disclosure.

FIG. 5 is a flowchart of a method for start feeding and use of a Parr system. In step 502 a plurality of tanks are operated. The tanks include fish that produce waste and create discharge water. The method includes transferring water from the tanks to a mechanical filtering system in step 504. An optional bypass step 506 circumvents the mechanical filters in the event of a failure of the mechanical filters, maintaining water flow through the RAS.

The water is then delivered to a first reservoir in step 508 where replacement water is added in step 510 and pH regulation through lime dosing occurs in step 512. The water is then pumped in step 514 from the first reservoir to a fixed bed biofilter in step 516. The water is then passed through a trickling biofilter in step 518 and on to a second reservoir in step 520.

An optional bypass step 525 diverts a portion of the water flow into the first reservoir in step 524 and/or to a denitrification filter 526 in step 528 prior to re-introduction into the tanks.

In one embodiment water in the second reservoir is temperature regulated in step 530 and then pumped in step 522 through a disinfecting UV apparatus in step 524. The process also includes passing the water flow through oxygen cones in step 526 prior to re-introduction of the water back into the tanks in step 528. Also, as noted above, at least one embodiment includes the oxygenation of the fish tanks, including the blowout section thereof, being accomplished by oxygen injection via the Venturi injection systems.

Figure 6:
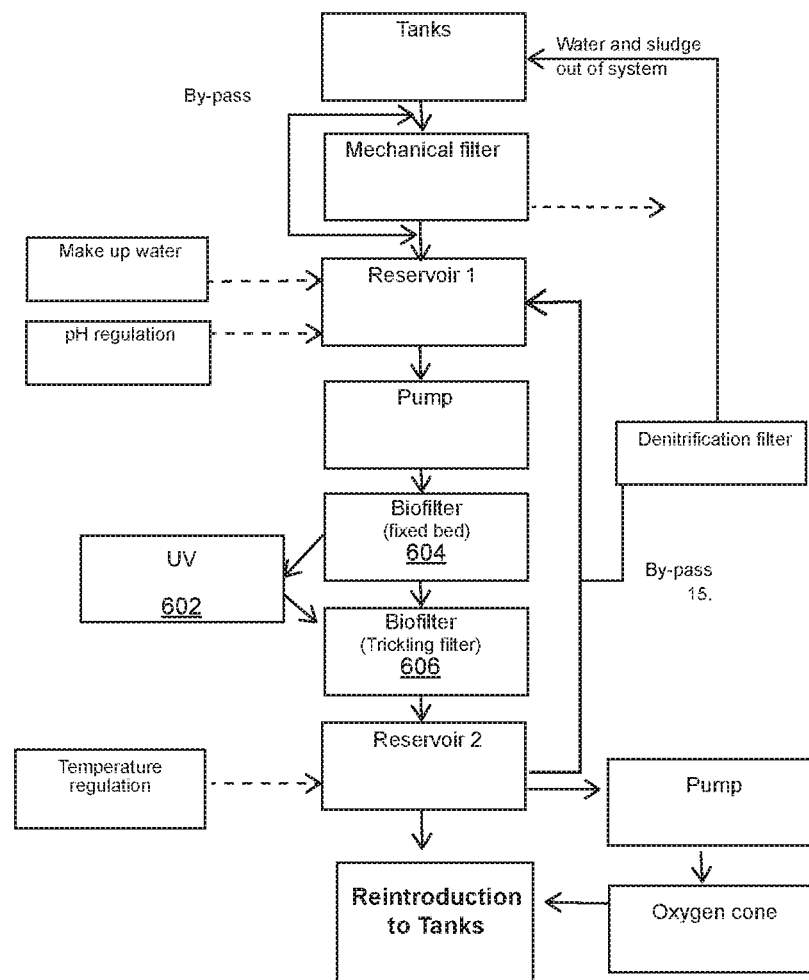
FIG. 6 is a flowchart of yet another example method of the present disclosure for operation of RASs of the present disclosure.

FIG. 6 is a flow diagram of a smolt and post smolt system operation. This process is largely similar to the process illustrated in FIG. 5 with the exception that a UV disinfecting apparatus is utilized in step 602, between a fixed bed biofilter and trickling filter processing steps 604 and 606.

Figure 7:
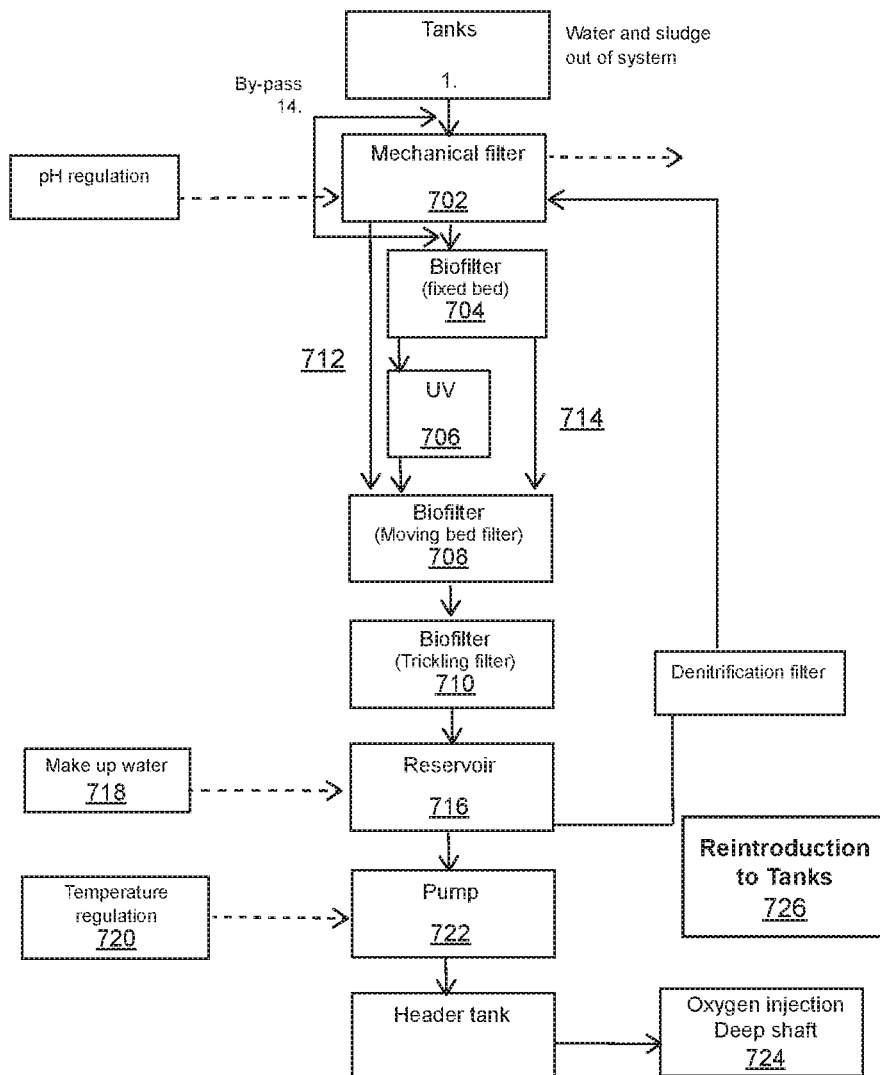
FIG. 7 is a flowchart of an additional example method of the present disclosure for operation of RASs of the present disclosure.

FIG. 7 illustrates an example method for on-growing of fish in the RAS. The method includes a step of directing water flow in fish tanks through a mechanical filter in step 702, a fixed bed biofilter in step 704, through an inline UV disinfecting apparatus in step 706, into a moving bed filter in step 708, and then to a trickling filter in step 710.

In one embodiment, the mechanical filter can be configured to divert water flow directly to the moving bed biofilter in step 712. The UV disinfecting apparatus can also be bypassed in step 714.

Water is directed into a reservoir in step 716 where replacement water is added into step 718. The water is pumped to a header tank after temperature regulation in steps 720 and 722. Oxygen injection using deep shaft processes occurs in step 724 prior to re-introducing the water into the fish tanks in step 726.

An optional step of denitrification can occur between the process of adding replacement water and subsequent mechanical filtering.

Figure 8:
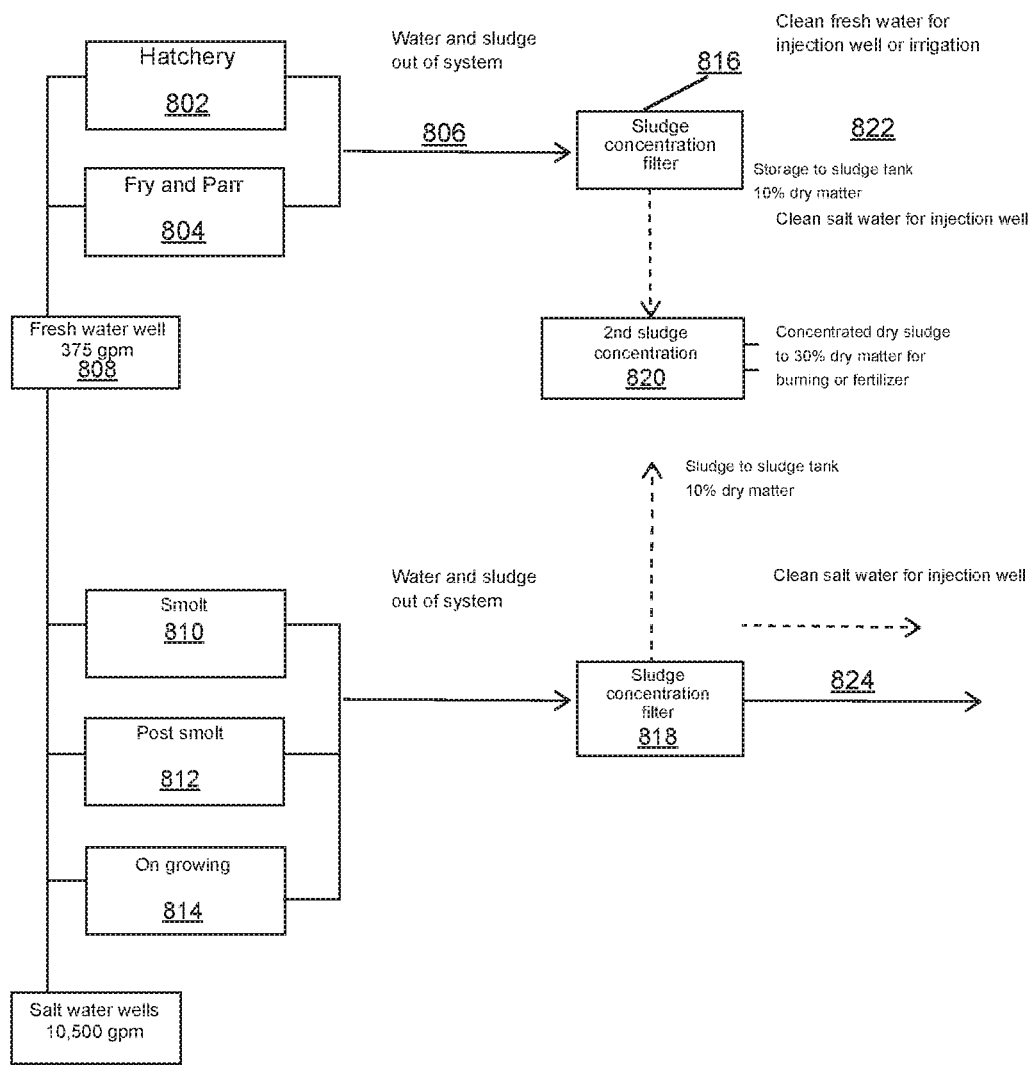
FIG. 8 is a flowchart of an example method of the present disclosure for processing sludge water produced by a RAS.

FIG. 8 is a flow diagram of an example fish rearing process using a hatchery and RAS described above. Fish from egg stage are maintained in a hatchery in step 802 and then transitioned into a fry and Parr system in step 804. During this process the RAS is operated and produces sludge water from cleaning of mechanical filters. Discharge water and sludge are transferred out of the RAS into sludge processing system in step 806. In step 808, replacement water is added to the water flow. Smolt tanks are operated in step 810. Fish are transferred to the post smolt tanks in step 812 and then into on-growing tanks in step 814. At each of these steps discharge water and sludge are produced and transferred out of the RAS.

Salt water from saline aquifer can be obtained at any point during operation of the system, at a specified rate, such as 10,500 gallons per minute.

The sludge is processed by passing the sludge water through a sludge concentration filter in steps 816 or 818. Once concentrated, the sludge is processed in a second concentration step 820. Sludge that is subject to the second concentration step can be used for combustion or fertilizer.

Water removed from the sludge in steps 816 or 818 is considered to be part of the wastewater and is cleaned prior to injection of the wastewater, via the second path of fluid flow 152, into the second segment of the saline aquifer, in step 822 or 824.

Since many modifications, variations and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A system for culturing aquatic life comprising:
    at least one tank structured to concurrently contain water and fish,
    a first path of fluid flow disposed in interconnecting, fluid communicating relation between said at least one tank and a first segment of a saline aquifer,
    said first path of fluid flow disposed and structured to deliver water from the first segment of the saline aquifer to said at least one tank,
    a wastewater injection assembly including a second path of fluid flow disposed in fluid communication with a second segment of the saline aquifer,
    said wastewater injection assembly operative to direct wastewater to the second segment of the saline aquifer, via said second path of fluid flow, and
    the first segment and the second segment of the saline aquifer being disposed at substantially segregated water levels of the saline aquifer.

2. The system as recited in claim 1 wherein said first path of fluid flow is disposed in fluid communication with the first segment of the saline aquifer having a salinity of between 5 to 30 ppt/liter.

3. The system as recited in claim 2 wherein said second path of fluid flow is disposed in fluid communication with the second segment of the saline aquifer at a water level a predetermined distance below the water level of the first segment of the saline aquifer.

4. The system as recited in claim 1 wherein said first and second paths of fluid flow are respectively disposed in fluid communication with the first segment and the second segment of a Floridan aquifer.

5. The system as recited in claim 1 further comprising a filter assembly disposed and structured to filter discharge water from said at least one tank and generate processed discharge water, said processed discharge water directed back into said at least one tank.

6. The system as recited in claim 5 wherein said filter assembly comprises a mechanical filter disposed and structured to remove solid portions of biological waste from said discharge water.

7. The system as recited in claim 6 wherein said filter assembly further comprises a biological filter disposed and structured to convert organic matter of the biological waste to create nitrogen.

8. The system as recited in claim 7 wherein said processed discharge water is defined by said discharge water passing through and from said mechanical filter and said biological filter; said processed discharge water directed from said filter assembly back into said at least one tank.

9. The system as recited in claim 8 wherein said filter assembly further comprises backwash facilities disposed and structured to clean said filter assembly by a backwash flow directed through said mechanical filter and said biological filter, said backwash flow generating sludge water included in said wastewater, said second path of fluid flow disposed in receiving relation to said wastewater and in fluid communication with the second segment of the saline aquifer.

10. The system as recited in claim 9 wherein said second path of fluid flow comprises a second pump facility and a second drill string, said second drill string disposed in fluid communication with said one tank, via said second pump facility, and an injection point disposed within the second segment of the saline aquifer.

11. The system as recited in claim 5 wherein said filter assembly further comprises backwash facilities disposed and structured to clean said filter assembly by a backwash flow directed there through, said backwash flow generating sludge water included in said wastewater, said wastewater disposed in fluid communication with the second segment of the saline aquifer via said second path of fluid flow.

12. The system as recited in claim 1 wherein said first path of fluid flow comprises a drill string and a pump facility; said drill string disposed in fluid communication with said at least one tank, via said pump facility and an extraction point disposed within the first segment of the saline aquifer.

13. The system as recited in claim 1 wherein said second path of fluid flow comprises a second pump facility and a second drill string, said second drill string disposed in fluid communication with said at least one tank, via said second pump facility, and an injection point disposed within the second segment of the saline aquifer.

14. A system for culturing aquatic life comprising:
at least one tank structured to concurrently contain water and fish,
a first path of fluid flow disposed in interconnecting, fluid communicating relation between said at least one tank and a first segment of a saline aquifer,
said first path of fluid flow disposed and structured to deliver water from the first segment of the saline aquifer to said at least one tank,
a recirculating system to post and structured to receive discharge water from said at least one tank and including a filter assembly,
said filter assembly disposed and structured to receive said discharge water and generate processed discharge water via the filtering of said discharge water, said processed discharge water recirculated back into said at least one tank,
a wastewater injection assembly including a second path of fluid flow disposed in fluid communication between said recirculation system and a second segment of the saline aquifer,
said wastewater injection assembly operative to direct wastewater to the second segment of the saline aquifer, via said second path of fluid flow, and
the first segment and the second segment of the saline aquifer being disposed at substantially segregated water levels of the saline aquifer.

15. The system as recited in claim 14 wherein said first and second paths of fluid flow are disposed in fluid communication with the first and second segments of a Floridan aquifer.

16. The system as recited in claim 14 wherein said filter assembly further comprises backwash facilities disposed and structured to generate a backwash flow through said filter assembly, said backwash flow generating sludge water, included in said wastewater, said wastewater disposed in fluid communication with and directed to the second segment of the saline aquifer via said second path of fluid flow.

17. The system as recited in claim 14 wherein said filter assembly comprises a mechanical filter disposed and structured to remove solid portions of biological waste from said discharge water; a biological filter disposed and structured to convert organic matter of the biological waste; said processed discharge water at least partially defined by filtered water from said mechanical and biological filters.

18. The system as recited in claim 14 wherein said recirculating system further comprises a first reservoir disposed in fluid communication with said at least one first tank and operative to regulate a pH level of water therein.

19. The system as recited in claim 18 wherein said recirculating system further comprises a second reservoir disposed in fluid communication with said first reservoir and operative to regulate temperature of water therein; said processed discharge water at least partially defined by discharge water issuing from said first and second reservoir.

20. The system as recited in claim 18 wherein said filter assembly comprises a mechanical filter disposed and structured to remove solid portions of biological waste from said discharge water; a biological filter disposed and structured to convert organic matter of the biological waste; said first and second reservoirs disposed in predetermined fluid communication with said mechanical filter and said biological filter; said processed discharge water at least partially defined by filtered, pH regulated and temperature regulated discharge water issuing collectively from said filter assembly and said first and second reservoirs; said processed discharge water subsequently recirculated back into said at least one tank.

* * * * *